United States Patent
Albuz et al.

(10) Patent No.: US 10,970,907 B1
(45) Date of Patent: Apr. 6, 2021

(54) SYSTEM AND METHOD FOR APPLYING AN EXPRESSION TO AN AVATAR

(71) Applicant: Facebook Technologies, LLC, Menlo Park, CA (US)

(72) Inventors: Elif Albuz, Los Gatos, CA (US); Melinda Ozel, San Francisco, CA (US); Tong Xiao, San Jose, CA (US); Sidi Fu, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 1 day.

(21) Appl. No.: 16/459,804

(22) Filed: Jul. 2, 2019

(51) Int. Cl.
*G06T 13/40* (2011.01)
*G06N 20/00* (2019.01)
*G06K 9/62* (2006.01)

(52) U.S. Cl.
CPC .............. *G06T 13/40* (2013.01); *G06K 9/623* (2013.01); *G06K 9/628* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2016/0027200 A1* | 1/2016 | Corazza | G06K 9/00362 345/420 |
| 2016/0328875 A1* | 11/2016 | Fang | G06K 9/00355 |

\* cited by examiner

*Primary Examiner* — Said Broome
(74) *Attorney, Agent, or Firm* — Foley & Lardner LLP

(57) ABSTRACT

Disclosed herein includes a system, a method, and a non-transitory computer readable medium for applying an expression to an avatar. In one aspect, a class of an expression of a face can be determined according to a set of attributes indicating states of portions of the face. In one aspect, a set of blendshapes with respective weights corresponding to the expression of the face can be determined according to the class of the expression of the face. In one aspect, the set of blendshapes with respective weights can be provided as an input to train a machine learning model. In one aspect, the machine learning model can be configured, via training, to generate an output set of blendshapes with respective weights, according to an input image. An image of an avatar may be rendered according to the output set of blendshapes with respective weights.

20 Claims, 11 Drawing Sheets

SYSTEM AND METHOD FOR APPLYING AN EXPRESSION TO AN AVATAR

FIELD OF DISCLOSURE

The present disclosure is generally related to applying an expression to an avatar, including but not limited to determining a facial expression and applying the facial expression to an avatar based on images acquired from a face.

BACKGROUND

Proliferation of artificial reality experiences (e.g., augmented reality (AR), virtual reality (VR), or mixed reality (MR)) allows communication through a new form. In one application, an avatar or a virtual representation of a real person can represent the person's movement or expression in artificial reality applications such as video games, virtual conferences, etc. For example, an avatar in a VR environment can smile to express happiness or can frown to express discontent.

Although an avatar may represent simple emotions, the avatar may be unable to represent or convey sophisticated or subtle emotions of a real person. In one aspect, a real person may present emotions through a combination of subtle movements, opening, closing, or positions of various facial parts or features (e.g., eye, eyebrow, lips), which is challenging to transfer or retarget to an avatar.

SUMMARY

Various embodiments disclosed herein are related to a method for applying an expression to an avatar. In retargeting or transferring an expression from one or more captured images of a user to a stylized avatar, a system may apply the expression to the avatar using a combination of blendshapes for instance. In some embodiments, the method includes determining, by one or more processors, a class of an expression of a face according to a set of attributes indicating states of portions of the face. In some embodiments, the method includes determining, by the one or more processors according to the class of the expression of the face, a set of blendshapes with respective weights corresponding to the expression of the face. In some embodiments, the method includes providing, by the one or more processors, the set of blendshapes with respective weights as an input to train a machine learning model. In some embodiments, the method includes configuring, by the one or more processors via training, the machine learning model to generate an output set of blendshapes with respective weights, according to an input image.

In some embodiments, the method further includes rendering an image of an avatar according to the output set of blendshapes with the respective weights. In some embodiments, the method further includes determining, for a first portion of the face in a first image, a first subset of the set of attributes, and determining, for a second portion of the face in a second image, a second subset of the set of attributes. In some embodiments, the method further includes providing an image of at least a portion of the face as another input to train the machine learning model.

In some embodiments, the set of attributes indicates at least one of whether an eye is closed, whether the eye is open, or whether the eye is squinting. In some embodiments, the class of the expression is determined from a defined group of classes of expressions including neutral, sad brow, angry, squint eye, lowered brow, and wrinkled nose. In some embodiments, determining the set of blendshapes, according to the class of the expression of the face, includes one of: determining an amount of wrinkle applied to a nose, determining an amount of shift applied to an outer portion of an eyebrow, determining an amount of shift applied to an inner portion of the eyebrow, determining an amount of opening of an eye, determining an amount of opening of a mouth, determining an amount of shift applied to a cheek, or determining an amount of shift applied to an eye lid.

In some embodiments, the method further includes determining, by the one or more processors, an additional class of an expression of an additional face according to an additional set of attributes indicating states of portions of the additional face. In some embodiments, the method further includes determining, by the one or more processors according to the additional class of the expression of the additional face, an additional set of blendshapes with respective weights corresponding to the expression of the additional face. In some embodiments, the method further includes providing, by the one or more processors, the additional set of blendshapes with respective weights as an input to train the machine learning model.

Various embodiments disclosed herein are related to a system for rendering an avatar. In some embodiments, the system includes one or more processors configured to determine a class of an expression of a face according to a set of attributes indicating states of portions of the face. In some embodiments, the one or more processors are configured to determine, according to the class of the expression of the face, a set of blendshapes with respective weights corresponding to the expression of the face. In some embodiments, the one or more processors are configured to provide the set of blendshapes with respective weights as an input to train a machine learning model. In some embodiments, the one or more processors are configured to configure, via training, the machine learning model to generate an output set of blendshapes with respective weights, according to an input image.

In some embodiments, the one or more processors are further configured to render an image of an avatar according to the output set of blendshapes with the respective weights. In some embodiments, the one or more processors are configured to determine, for a first portion of the face in a first image, a first subset of the set of attributes. In some embodiments, the one or more processors are configured to determine, for a second portion of the face in a second image, a second subset of the set of attributes. In some embodiments, the one or more processors are further configured to provide an image of at least a portion of the face as another input to train the machine learning model.

In some embodiments, the set of attributes indicates at least one of whether an eye is closed, whether the eye is open, or whether the eye is squinting. In some embodiments, the class of the expression is determined from a defined group of classes of expressions including neutral, sad brow, angry, squint eye, lowered brow, and wrinkled nose. In some embodiments, the one or more processors are configured to determine the set of blendshapes, according to the class of the expression of the face, by at least one of: determining an amount of wrinkle applied to a nose, determining an amount of shift applied to an outer portion of an eyebrow, determining an amount of shift applied to an inner portion of the eyebrow, determining an amount of opening of an eye, determining an amount of opening of a mouth, determining an amount of shift applied to a cheek, or determining an amount of shift applied to an eye lid.

In some embodiments, the one or more processors are further configured to determine an additional class of an expression of an additional face according to an additional set of attributes indicating states of portions of the additional face. In some embodiments, the one or more processors are further configured to determine, according to the additional class of the expression of the additional face, an additional set of blendshapes with respective weights corresponding to the expression of the additional face. In some embodiments, the one or more processors are further configured to provide the additional set of blendshapes with respective weights as an input to train the machine learning model.

Various embodiments disclosed herein are related to a non-transitory computer readable medium storing instructions for rendering an avatar. In some embodiments, the non-transitory computer readable medium stores instructions when executed by one or more processors cause the one or more processors to determine a class of an expression of a face according to a set of attributes indicating states of portions of the face. In some embodiments, the instructions further cause the one or more processors to determine, according to the class of the expression of the face, a set of blendshapes with respective weights corresponding to the expression of the face. In some embodiments, the instructions further cause the one or more processors to provide the set of blendshapes with respective weights as an input to train a machine learning model. In some embodiments, the instructions further cause the one or more processors to configure, via training, the machine learning model to generate an output set of blendshapes with respective weights according to an input image.

In some embodiments, the non-transitory computer readable medium further includes instructions when executed by the one or more processors further cause the one or more processors to render an image of an avatar according to the output set of blendshapes with the respective weights. In some embodiments, the non-transitory computer readable medium further includes instructions when executed by the one or more processors further cause the one or more processors to determine, for a first portion of the face in a first image, a first subset of the set of attributes. In some embodiments, the non-transitory computer readable medium further includes instructions when executed by the one or more processors further cause the one or more processors to determine, for a second portion of the face in a second image, a second subset of the set of attributes.

In some embodiments, the non-transitory computer readable medium further includes instructions when executed by the one or more processors further cause the one or more processors to determine an additional class of an expression of an additional face according to an additional set of attributes indicating states of portions of the additional face. In some embodiments, the non-transitory computer readable medium further includes instructions when executed by the one or more processors further cause the one or more processors to determine, according to the additional class of the expression of the additional face, an additional set of blendshapes with respective weights corresponding to the expression of the additional face. In some embodiments, the non-transitory computer readable medium further includes instructions when executed by the one or more processors further cause the one or more processors to provide the additional set of blendshapes with respective weights as an input to train the machine learning model.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1A:
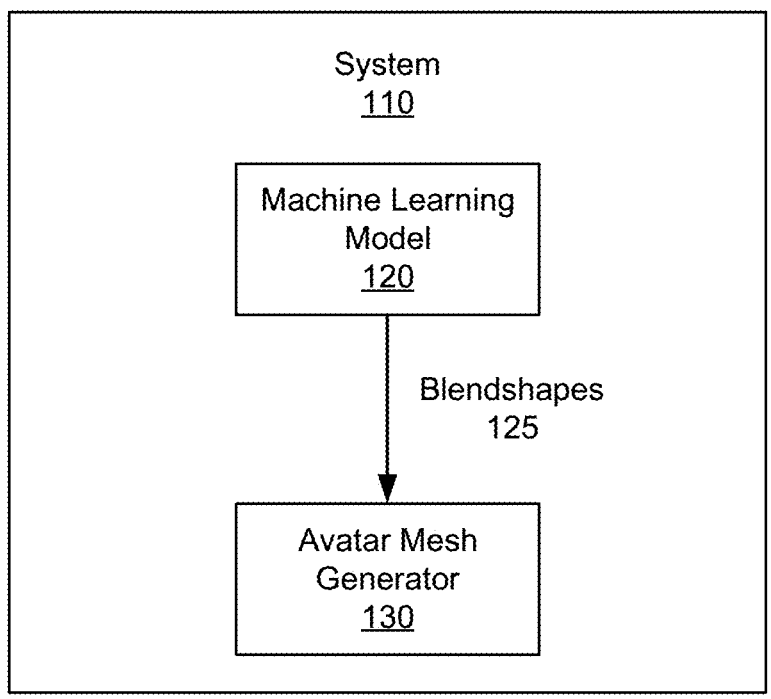
FIG. 1A is a block diagram of a system for applying an expression to an avatar, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein include embodiments of a system, a method, and a non-transitory computer readable medium for applying one or more expressions to an avatar. In one approach, an image including at least a portion of a face is assigned to or associated with a set of attributes (e.g., assigned and/or determined manually, or via image recognition software). In one aspect, a set of attributes can indicate states (e.g., characteristics, contortions, shapes, differential/relative displacements of facial features) of the portion of the face. For example, an attribute can indicate whether an eye brow is raised, whether an eye is fully opened or squinting, etc. According to the set of attributes, a class (e.g., category, classification or type) of an expression of a face can be determined or identified. In one aspect, a class of an expression indicates whether a person in an image is expressing anger, neutral emotion, or sadness, etc. According to the class of the expression of the face and/or the set of attributes, a set of blendshapes (e.g., with respective weights) corresponding to the expression of the face can be determined, e.g., from a plurality of defined blendshapes. A blendshape can include, correspond to, or be indicative of a structure, shape and/or profile of at least a portion or component of a body (e.g., a face), of an avatar for instance. A number of blendshapes can be selected, stitched, weighted, combined, blended, overlaid and/or merged to form a specific or customized profile (e.g., facial expression).

In one aspect, the weight of each blendshape can indicate how much to emphasize or de-emphasize a shape or structure of a corresponding portion of a face of an avatar, and/or how to deform or modify the corresponding portion of the face. For example, weight of a first blendshape can indicate an amount or degree of emphasis applied to a shape of the first blendshape, or of movement or change applied to an eyebrow of an avatar, and weight of a second blendshape can indicate an amount or degree of emphasis applied to a shape of the second blendshape, or of movement or change applied to lips of the avatar. According to the set of blendshapes (e.g., combining, molding and/or morphing the blendshapes together by relative amounts according to the weights), a three dimensional (3-D) model of the avatar can be formed, constructed, generated and/or rendered.

In one aspect, a machine learning model can be trained by applying a plurality of images (e.g., more than a thousand or a million images) capturing face portions, segments or parts (sometimes generally referred to as face parts) as inputs, and applying associated blendshapes as target outputs or ground truths. After the training (e.g., responsive to or based on the training), the machine learning model is configured to automatically determine a set of blendshapes with corresponding weights for input images of different face parts of a person. According to the determined set of blendshapes (e.g., with or without corresponding weights for customizing a mix or combination of the blendshapes), parts of an avatar can be generated, constructed, modeled, modified and/or adjusted to render an image of the avatar with a realistic expression.

Advantageously, the disclosed system, method and non-transitory computer readable medium can allow a machine learning model to determine a complex set of blendshapes (e.g., with corresponding weights) for an image capturing a face part (e.g., not the full face) by training the machine learning model using target blendshapes determined based on attributes and/or classes discussed herein. In one approach, tracking positions, statuses, or movements of face parts, and directly applying such tracked positions, statuses, or movements of face parts to an avatar are difficult or unfeasible. For example, a movement, shape or position of a face part of a person may not linearly and/or deterministically correspond or map to a part of an avatar, because an appearance of a person may be drastically different from an appearance (e.g., exaggerated or highly stylized appearance) of an avatar. By training a machine learning model with images and a wide range of target blendshapes determined based on corresponding attributes and/or classifications of expression of faces, the machine learning model can automatically determine a complex set of blendshapes (e.g., with corresponding weights) for images comprising or capturing face parts of a person. Furthermore, an image of an avatar can be rendered according to the set of blendshapes and/or weights to represent a realistic and sophisticated expression.

Referring to FIG. 1A, illustrated is a block diagram of a system 110 for rendering an avatar with realistic expressions, according to an example implementation of the present disclosure. In some embodiments, the system 110 includes a machine learning model 120 and an avatar mesh generator 130. These components can operate together to access, receive or obtain input images each capturing a corresponding face part (e.g., eye, nose, mouth, partial face, etc.) of a person, and automatically determine a set of blendshapes 125 with corresponding weights indicating how to combine, emphasize, deform and/or modify parts of an avatar (e.g., to reflect a specific facial expression). Moreover, these components may operate together to generate an avatar with parts shaped, modified or adjusted according to the determined set of blendshapes 125 with corresponding weights, and to render an image of (an expression of) the avatar. In one aspect, the system 110 can operate in two phases: a training phase and a runtime phase. In the training phase, the machine learning model 120 may be trained, set or configured according to input images capturing face parts and associated sets of blendshapes with corresponding weights as target blendshapes or ground truth. In the runtime phase, input images capturing different face parts and/or expressions of a person can be applied or input to the machine learning model 120 to determine or estimate a set of blendshapes (e.g., with or without corresponding weights). Moreover, in the runtime phase, an image of the avatar can be rendered according to the determined or estimated set of blendshapes.

Figure 1B:
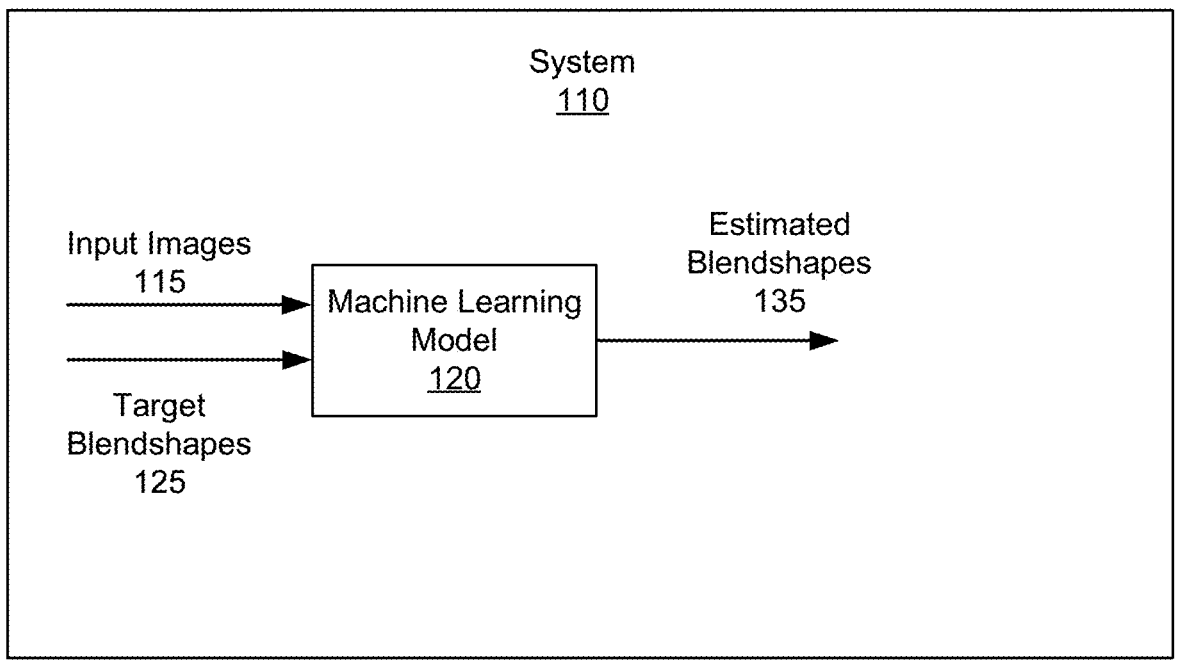
FIG. 1B is a block diagram of the system of FIG. 1A in a training phase, according to an example implementation of the present disclosure.

Referring to FIG. 1B, illustrated is a block diagram of the system of FIG. 1A in a training phase, according to an example implementation of the present disclosure. In the training phase, the system 110 can obtain, receive or access input images (e.g., more than a thousand or a million images) each capturing a corresponding face part (e.g., eye, nose, mouth, etc.) and/or expression, from a server or a different device. In the training phase, the system 110 may also receive, determine, select and/or identify target blendshapes 125 with corresponding weights for the input images 115. In the training phase, the system 110 may set, update and/or configure parameters (e.g., coefficients, weights, biases, or any combination of these of a neural network) of the machine learning model 120 via training by applying the input images to the machine learning model 120 and applying the target blendshapes 125 (e.g., with corresponding weights) as targets or ground truths.

In one approach, the system 110 can determine, for one or more input images 115, a set of target blendshapes 125 according to a set of attributes of the one or more input images 115. The set of attributes can be determined or assigned manually (e.g., by a labeler or other person) or non-manually (e.g., automatically using software that analyzes or performs recognition on the input images 115). Each input image 115 may be assigned to or is associated with a corresponding set of attributes. In one aspect, an attribute can indicate a state (e.g., characteristic, shape, distortion) of a face part. For example, an attribute can indicate whether an eye brow is raised, whether an eye is fully opened or squinting, etc. In one approach, each input image 115 can be assigned to or is associated with a corresponding set of attributes through a manual review of the input image 115 by a human reviewer. In another approach, the system 110 may automatically assign or determine, for each input image 115, a corresponding set of attributes. In at least part of the training phase or before the training phase, the system 110 may classify one or more input images 115 into a corresponding class (e.g., category, type or classification of expression and/or visible representation of emotion) indicating whether a person in the one or more input images is expressing or showing anger, neutral emotion, or sadness, etc. For example, the system 110 can automatically map, convert and/or translate attributes of one or more input images 115 to a corresponding class according to mapping information indicating mapping(s) between attributes and classes. In addition, in the training phase or before the training phase, the system 110 can automatically determine, for one or more input images, weights of a corresponding set of blendshapes according to the set of attributes and/or the class, where weight of a blendshape can indicate how to model, shape (e.g., emphasize or blend a shape/structure), deform and/or modify a corresponding part of an avatar. For example, a first weight of a first blendshape can indicate or cause to raise an upper lip by 5 mm, a second weight of a second blendshape can indicate or cause to fully open a right eye, and a third weight of a third blendshape can indicate or cause to close a left eye. The system 110 may automatically determine combinations or subsets of blendshapes according to mapping information indicating mappings between i) attributes and/or classes, and ii) weights and/or combinations of blendshapes. The system 110 may automatically determine weights of blendshapes according to mapping information indicating mappings between i) attributes and/or classes, and ii) weights and/or combinations of blendshapes.

In the training phase, the system 110 can apply input images 115 capturing face parts and/or one or more expressions of the face, to the machine learning model 120 as inputs with corresponding sets of target blendshapes 125 (e.g., with weights) as targets or ground truths, to adjust or modify parameters (e.g., coefficients, weights, biases, or any combination of them) of the machine learning model 120 via training. For example, the system 110 can apply one or more input images 115 to the machine learning model 120 to generate, estimate or determine a set of estimated blendshapes 135. The system 110 may compare the set of estimated blendshapes 135 with a set of target blendshapes 125, and adjust, update or modify parameters of the machine learning model 120 according to the comparison, such that the machine learning model 120 can generate, estimate or determine a set of estimated blendshapes 135 closer to the set of target blendshapes 125. The system 110 may apply a large number of input images 115 (over a thousand or a million) to iteratively adjust, update or modify the parameters of the machine learning model 120 to improve accuracy of the estimated blendshapes 135 and/or weights in the training phase.

Figure 1C:
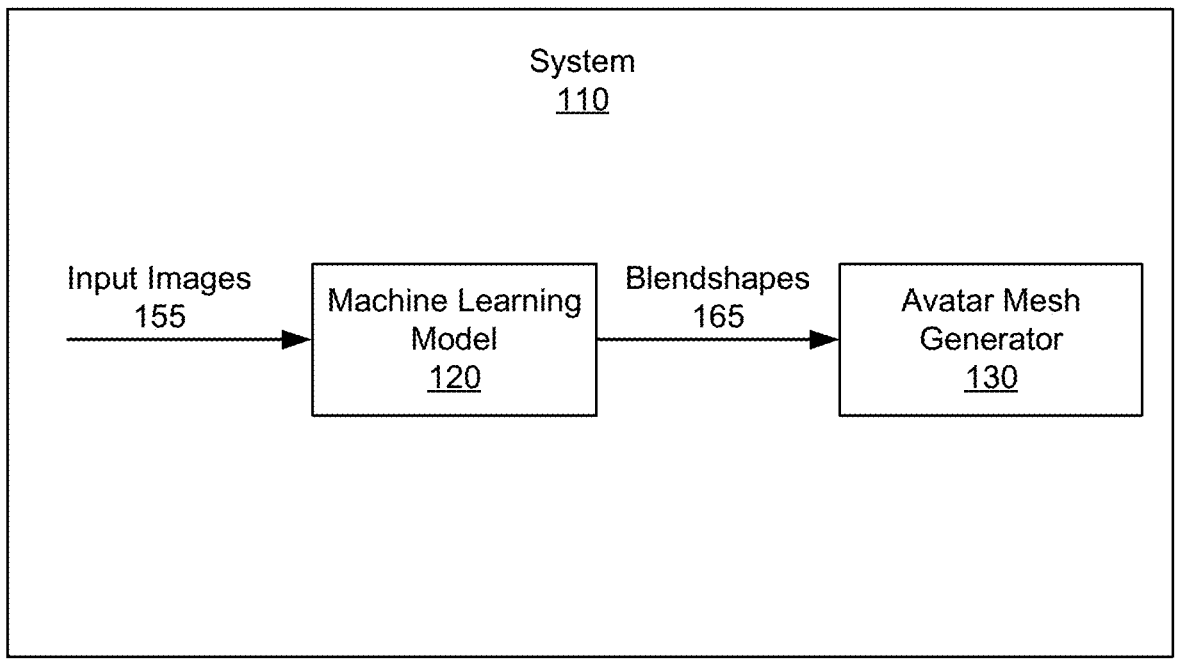
FIG. 1C is a block diagram of the system of FIG. 1A in a runtime phase, according to an example implementation of the present disclosure.

Referring to FIG. 1C, illustrated is a block diagram of the system 110 of FIG. 1A in a runtime phase, according to an example implementation of the present disclosure. In the runtime phase, the system 110 can apply one or more input images 155 capturing face parts (with an expression) of a person to generate, obtain, or estimate a set of blendshapes 165 for the input images 155. The system 110 may apply the set of blendshapes 165 to the avatar mesh generator 130 to generate a 3-D mesh model (e.g., data representation) of an avatar with parts of the avatar formed and/or modified according to the set of blendshapes 165. The system 110 may render an image (e.g., visual representation) of the 3-D mesh model of the avatar. In one aspect, the image of the avatar with a realistic (e.g., complex, sophisticated, nuanced and/or accurate) expression (e.g., consistent with the input image(s)) can be rendered in an artificial reality application such as a video game or a virtual conference in real time.

Figure 2:
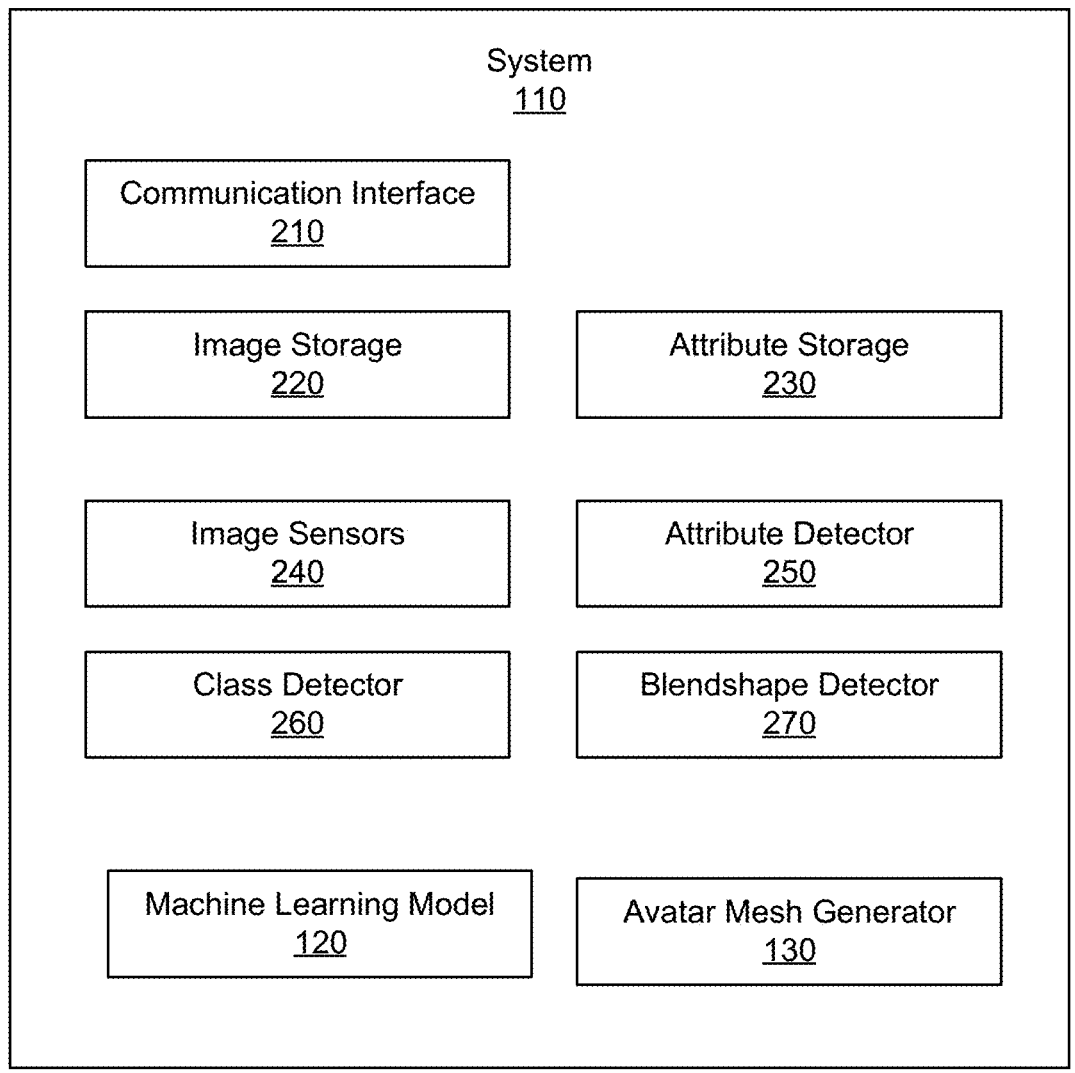
FIG. 2 is a block diagram of a system for applying an expression to an avatar, according to an example implementation of the present disclosure.

Referring to FIG. 2, illustrated is a block diagram of the system 110 for applying expressions to an avatar, according to an example implementation of the present disclosure. In some embodiments, the system 110 includes a communication interface 210, an image storage 220, an attribute storage 230, image sensors 240, an attribute detector 250, a class detector 260, a blendshape detector 270, the machine learning model 120, and/or the avatar mesh generator 130. One or more of these components can operate together to determine a set of blendshapes for input images capturing face parts, and can generate a 3-D model of an avatar with a realistic expression according to the set of blendshapes. In some embodiments, these components may be implemented as a software module executable on a processor of the system 110 with a non-transitory computer readable medium storing instructions that when executed by the processor cause the processor to perform various operations disclosed herein. In some embodiments, these components may be implemented as a hardware module on a field programmable gate logic (FPGA) or an application-specific integrated circuit (ASIC). In other embodiments, the system 110 includes more, fewer, or different components than shown in FIG. 2.

The communication interface 210 can be a component that communicates with other systems or devices to receive and/or transmit data. In some implementations, the communication interface 210 communicates with other systems or devices through a wired communication (e.g., local area network) or a wireless communication (e.g., Wi-Fi, cellular network, etc.). In one approach, the communication interface 210 receives, from a remote server or a database, input images and corresponding sets of attributes. Each input image may be associated with or is assigned to a corresponding set of attributes by a person or a reviewer through a manual process for instance, and stored by the remote server. The communication interface 210 may receive input images and the corresponding sets of attributes from the remote server or the database to configure or set parameters of the machine learning model 120 in the training phase. The communication interface 210 may store the received input images in the image storage 220, and the received sets of attributes in the attributes storage 230.

The image sensors 240 can include or correspond to components that capture images of face parts. Each image sensor 240 may be mounted, positioned, oriented, designed and/or implemented to capture a corresponding portion of a face of a person, but not the full face of the person for instance. For example, a first image sensor can capture an image of a left eye of a person, a second image sensor captures an image of a right eye of the person, and a third image sensor can capture an image of at least part of a nose and a mouth of the person. The image sensors 240 may store the captured images at the image storage 220. In some embodiments, limited part(s) of a face can be imaged and made available for processing, due to the head mounted display covering a significant portion of the face, and the limited fields of view of image sensors mounted at various constrained locations of the head mounted display.

The attribute detector 250 can include or correspond to a component that (e.g., automatically) detects, identifies, determines and/or selects a set of attributes of a face part in an image, according to an expression or facial characteristic captured in the image for instance. In one approach, the attribute detector 250 obtains an image captured by an image sensor 240 or an image received by the communication interface 210, and automatically determines a set of attributes of the obtained image. For example, the attribute detector 250 determines whether an eye is closed, whether the eye is fully opened, whether the eye is squinting, whether an inner brow is raised, whether an eye is smiling, etc.

The class detector 260 can include or correspond to a component that determines, identifies and/or selects a class of expression for one or more input images according to attributes associated with (e.g., determined for) the input images. In one approach, the class detector 260 stores or obtains mapping information indicating mapping between attributes and corresponding classes. Examples of classes (e.g., types, categories or classifications of expressions and/or emotion) can include neutral (neutral expression/emotion), sad brow, angry, squint eye, lowered brow, wrinkled nose, etc. The class detector 260 may map attributes of input images 115 to a corresponding class according to the mapping information. For example, the class detector 260 may determine that an attribute of a wrinkled nose in a first image of a person and an attribute of a raised eyebrow in a second image of the person map to a class of angry emotion.

The blendshape detector 270 can include or correspond to a component that determines, identifies and/or selects a set of blendshapes (e.g., with respective weights) according to attributes and/or a class. In one approach, the blendshape detector 270 stores or obtains mapping information indicating mapping(s) between classes and/or attributes, and corresponding blendshapes (e.g., with their weights). Examples of blendshapes may include nose wrinkler, brow raiser, brow lowerer, eye closer, inner brow raiser, cheek raiser, lid tightener, upper lid raiser, etc. For example, a weight of a nose wrinkler can indicate an amount of wrinkles applied to a nose of an avatar. As another example, a weight of a brow raiser can indicate an amount of change, distortion or shift applied to an eyebrow of the avatar. The blendshape detector 270 may map attributes of one or more input images 115 and/or a class of the one or more input images 115, to weights of a corresponding set of blendshapes according to the mapping information. For example, the class detector 260 may determine weights to apply a maximum amount of wrinkles applied to a nose and to apply a maximum amount to raise an eyebrow of an avatar, according to an angry class with attributes of a wrinkled nose and a raised eye brow.

The machine learning model 120 can be trained, set or configured according to input images and the sets of target blendshapes (e.g., with corresponding weights) from the blendshape detector 270 in the training phase. Detailed description regarding the operation of the machine learning model 120 in the training phase is provided above with respect to FIG. 1B. The machine learning model 120 can be set or configured to estimate or determine weights of the blendshapes for input images, and a 3-D mesh model of an avatar can be generated according to the blendshapes (and the weights) in the runtime phase. Detailed description regarding the operation of the machine learning model 120 and the avatar mesh generator 130 in the runtime phase is provided above with respect to FIG. 1C. Thus, duplicated description thereof is omitted herein for the sake of brevity.

Figure 3:
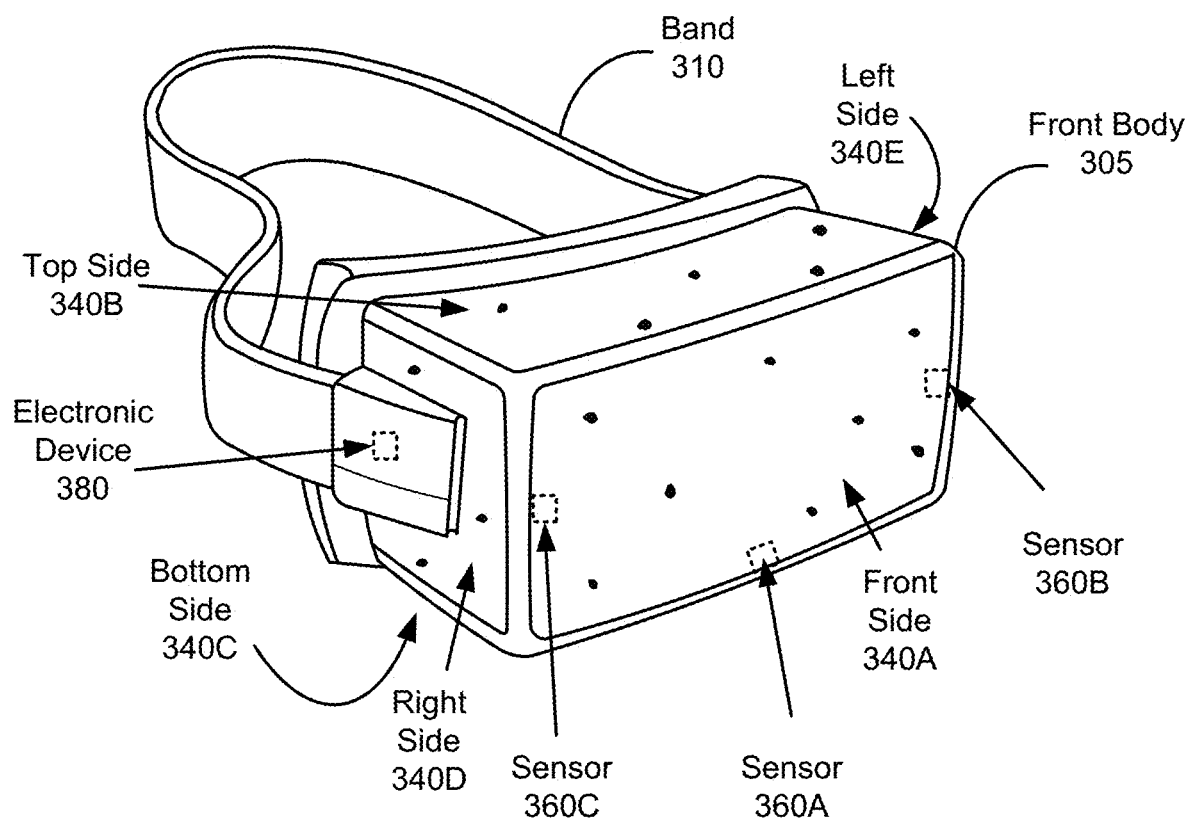
FIG. 3 is a plan view of an example head mounted display for providing artificial reality experiences, according to an example implementation of the present disclosure.

FIG. 3 is a plan view of an example head mounted display (HMD) 300 for providing artificial reality experiences, according to an example implementation of the present disclosure. In some embodiments, the HMD 300 includes a front body 305, a band 310, a left side 330E, a top side 330B, a right side 330D, a bottom side 330C, and/or a front side 340A. The front body 345 can also include an electronic device 380, and sensors 360A-360C. In some embodiments, the electronic device 380 may be embodied as one or more integrated circuits. The electronic device 380 and the sensors 360A-360C may operate as the system of 110 of FIG. 1. In some embodiments, the electronic device 380 may operate together with a remote computing device (not shown) to operate as the system 110 of FIG. 1. In some embodiments, the sensors 360A-360C are image sensors or cameras electrically and/or communicatively coupled to the electronic device 380. In the embodiment shown by FIG. 3, the electronic device 380 and the sensors 360A-360C may be located at any parts of the HMD 300. In some embodiments, the sensor 360A (e.g., based on its location, orientation and/or field of view) captures an image of a nose and a mouth, the sensor 360B captures an image of a left eye, and the sensor 360C captures an image of a right eye. In some embodiments, the HMD 300 presents an image of an artificial reality (e.g., AR, VR, or MR) environment to a user wearing the HMD 300. Moreover, the HMD 300 may capture images of face parts of the user (responding to the artificial reality), and render an avatar (for the artificial reality environment) with realistic expression as disclosed herein.

Figure 4A:
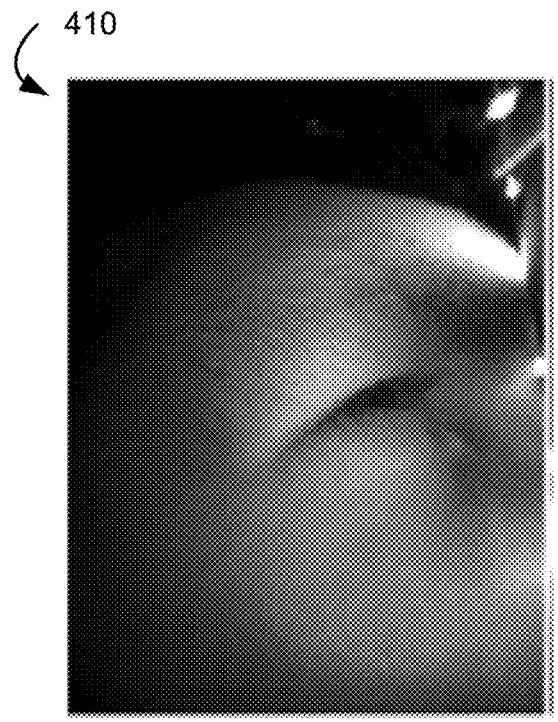
FIG. 4A is an example captured image of a right eye of a person wearing a head mounted display (also sometimes referred to as a wearable head display), according to an example implementation of the present disclosure.
Figure 4B:
FIG. 4B is an example captured image of a left eye of the person wearing the head mounted display, according to an example implementation of the present disclosure.
Figure 4C:
FIG. 4C is an example captured image of a nose and a mouth of the person wearing the head mounted display, according to an example implementation of the present disclosure.

Referring to FIG. 4A, illustrated is an example captured image 410 of a right eye of a person wearing the HMD 300 of FIG. 3 for instance, according to an example implementation of the present disclosure. Referring to FIG. 4B, illustrated is an example captured image 420 of a left eye of the person wearing the HMD 300 of FIG. 3 for instance, according to an example implementation of the present disclosure. Referring to FIG. 4C, illustrated is an example captured image 430 of a nose and a mouth of the person wearing the HMD 300 of FIG. 3 for instance, according to an example implementation of the present disclosure.

In one example, the captured images 410, 420, 430 are applied (e.g., as a related set of images acquired at a time instance, that separately and collectively provides visual information about a facial expression at that time instance) to the machine learning model 120 for training. In one approach, each image 410, 420, 430 (or all three images collectively) is assigned to a corresponding set of attributes, for example, by a manual review process. The class detector 260 may automatically determine a class of expression according to attributes assigned to the images 410, 420, 430. The class detector 260 and/or a blendshape detector 270 can determine a set of blendshapes according to the determined class and/or the attributes of the images 410, 420, 430. For example, the image 410 is assigned to an attribute of a squinting eye, the image 420 is assigned to an attribute of a raised eyebrow, and the image 430 is assigned to an attribute of a neutral mouth. The class detector 260 may determine that the class of expression of the images 410, 420, 430 is a raised eyebrow or a suspicious expression through mapping of the attributes. The blendshape detector 270 may determine a set of blendshapes with corresponding weights to generate an avatar with the suspicious expression.

Figures 5A, 5B:
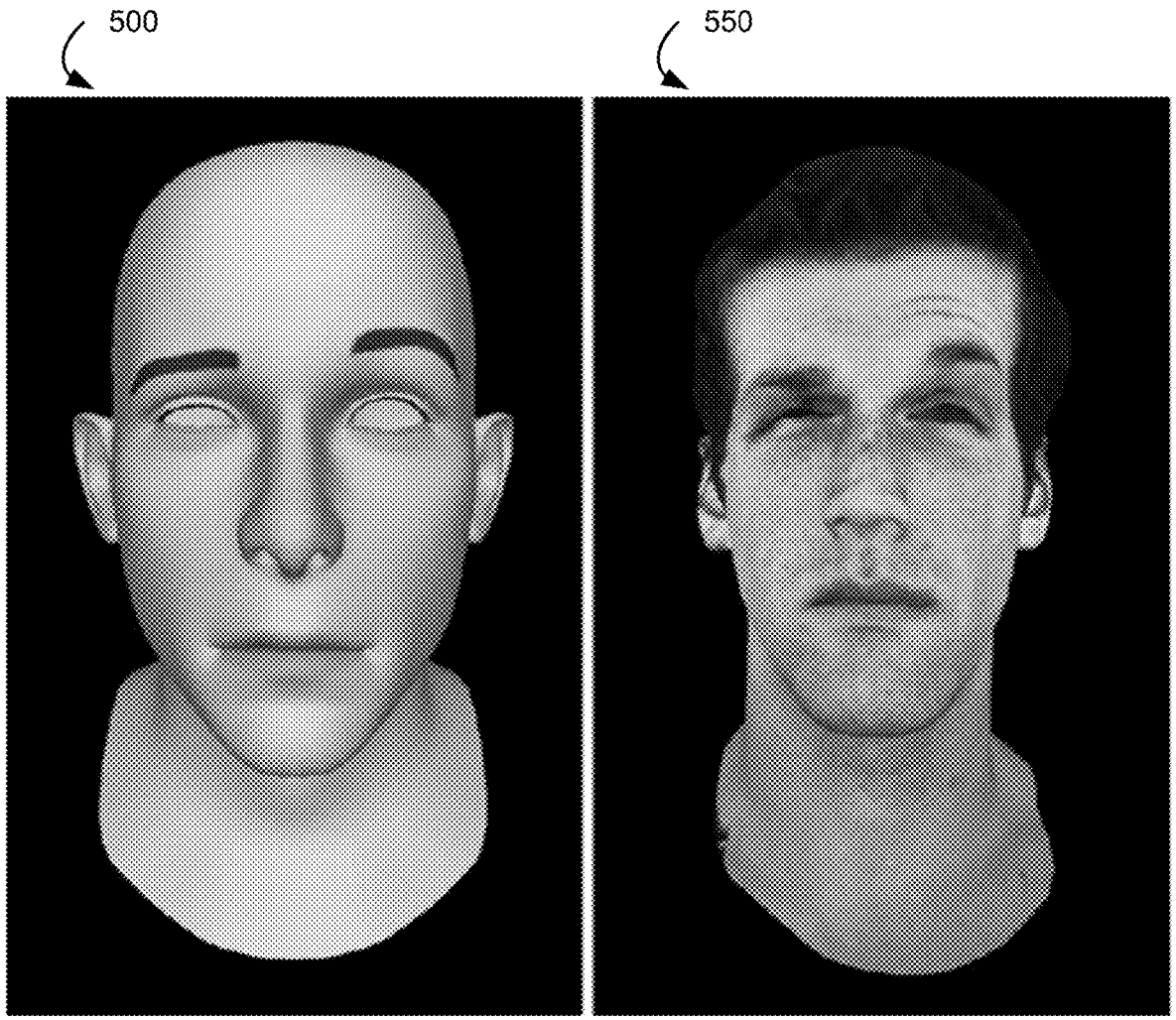
FIG. 5A is an example image of an avatar, according to an example implementation of the present disclosure.
FIG. 5B is an example image of another avatar, according to an example implementation of the present disclosure.
Figure 6A:
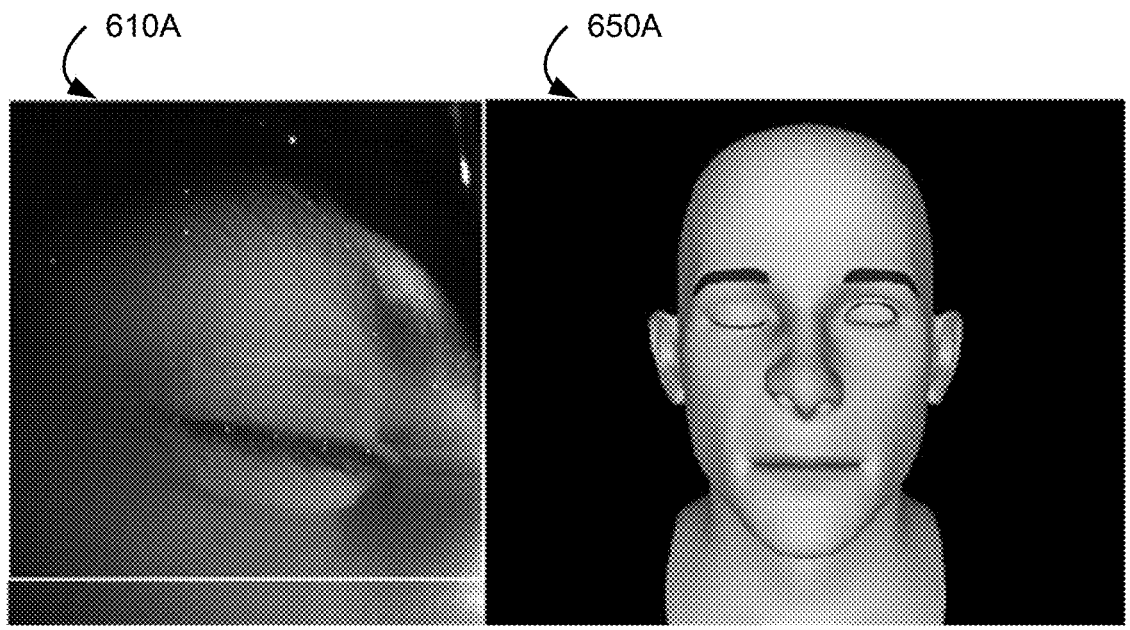
FIGS. 6A-6D are example images associated with different attributes of a right eye and corresponding renditions of an avatar, according to an example implementation of the present disclosure.
Figure 6B:
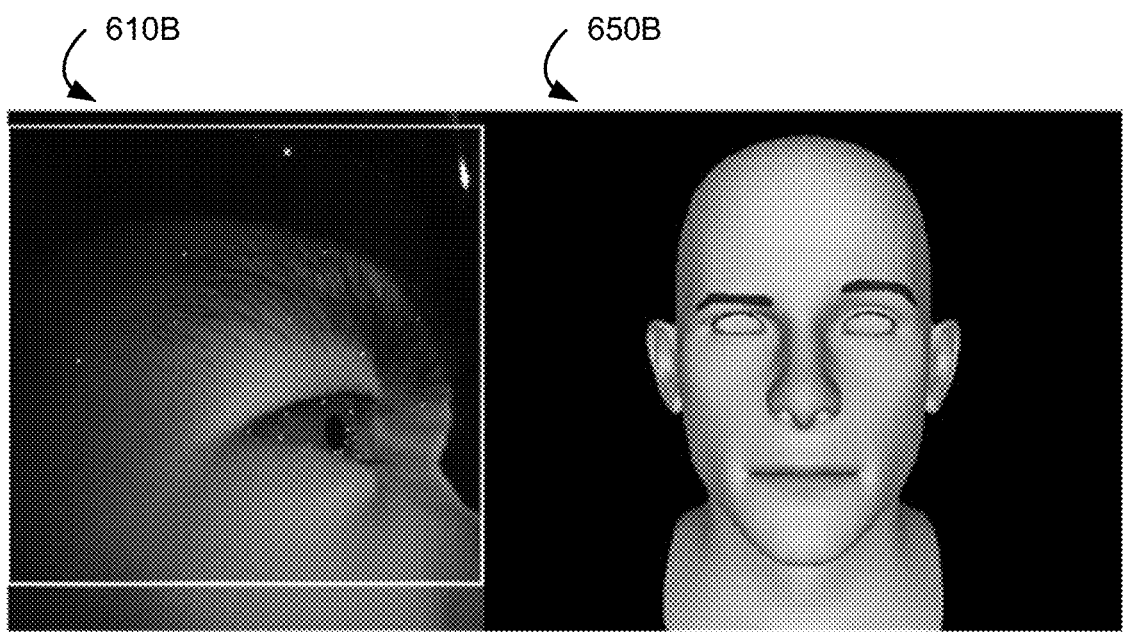
Figure 6C:
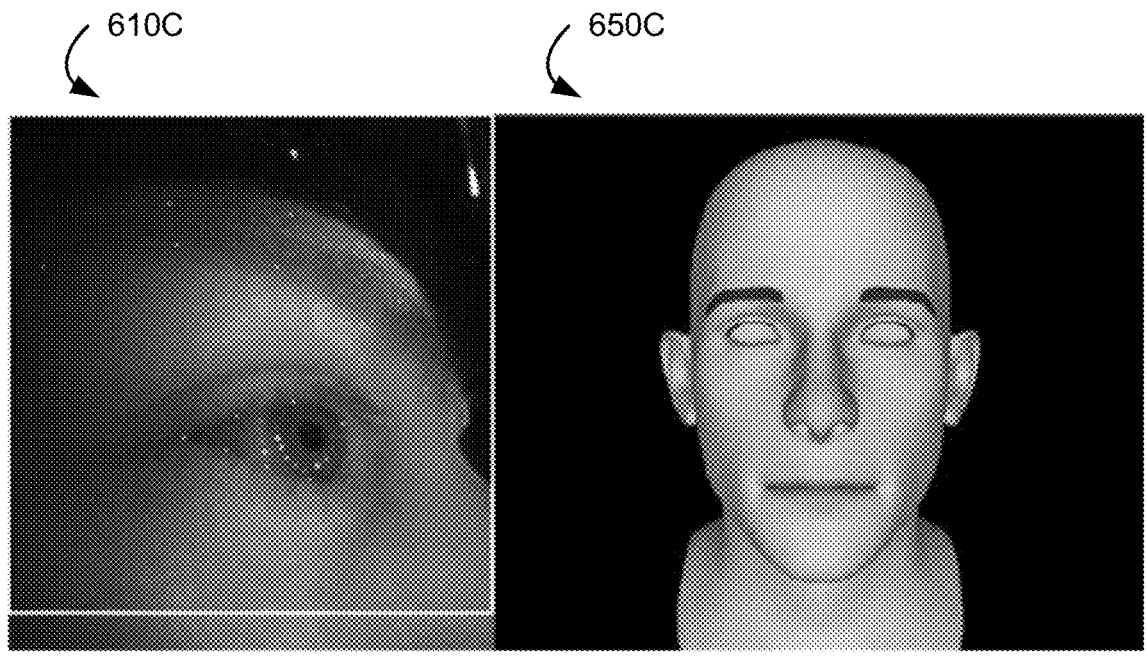
Figure 6D:
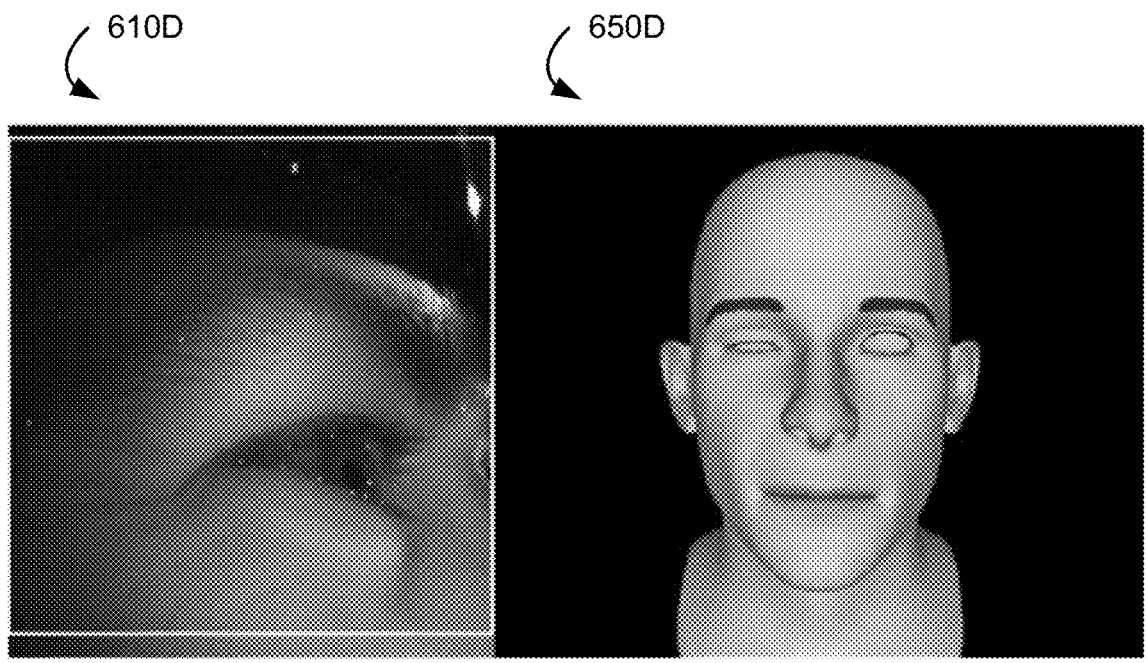

Referring to FIG. 5A, illustrated is an example image 500 of an avatar, according to an example implementation of the present disclosure. Referring to FIG. 5B, illustrated is an example image 550 of another avatar, according to an example implementation of the present disclosure. The avatars may be generated according to the set of blendshapes of the captured images 410, 420, 430 to represent realistic expressions.

FIGS. 6A-6D include example captured images 610A-610D associated with different attributes of a right eye and corresponding renditions or images 650A-650D of an avatar, according to an example implementation of the present disclosure. In one example, the image 610A is assigned to a closed right eye, and blendshapes of the image 610A can be applied to render the avatar with the closed right eye. In another example, the image 610B is assigned to a lowered right brow, and blendshapes of the image 610B can be applied to render the avatar with the lowered right brow. In another example, the image 610C is assigned to a neutral eye, and blendshapes of the image 610C can be applied to render the avatar with the neutral eye. In another example, the image 610D is assigned to a squint right eye, and blendshapes of the image 610D can be applied to render the avatar with the squint right eye. In one aspect, parameters of the machine learning model 120 are configured or set, via training, by applying input images and blendshapes determined according to attributes of the input images as inputs to the machine learning model 120, such that the machine learning model 120 can receive as input captured images 610A-610D, and generate, output or determine a set of blendshapes with corresponding weights that allows rendering of an avatar with realistic and sophisticated expressions.

Figure 7:
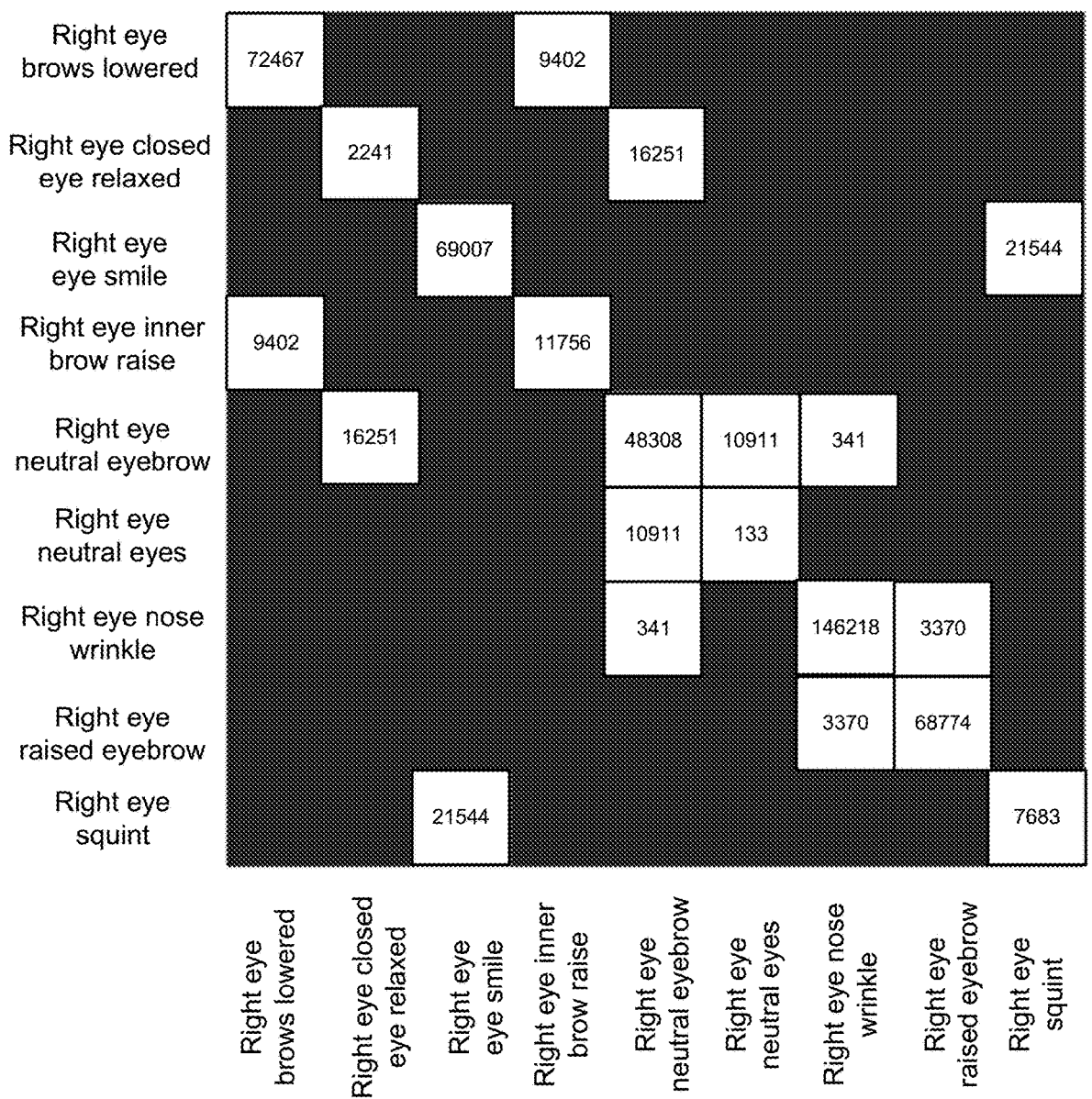
FIG. 7 is a chart showing a combination of different attributes of an eye, according to an example implementation of the present disclosure.

FIG. 7 is a chart 700 showing a combination of different attributes of an eye, according to an example implementation of the present disclosure. In one aspect, an image can be assigned to one or more attributes. A number in each box of the chart 700 indicates an example of a number of images assigned to attributes associated with a row and a column of the box. In one example, an image can be assigned to the attributes of "right eye brows lowered" and "right eye inner brow raise," simultaneously. Such variety of options or combinations available for attributes allow classes and blendshapes to be determined from a larger spectrum, and can enable an avatar to express various types of sophisticated expressions.

Figure 8:
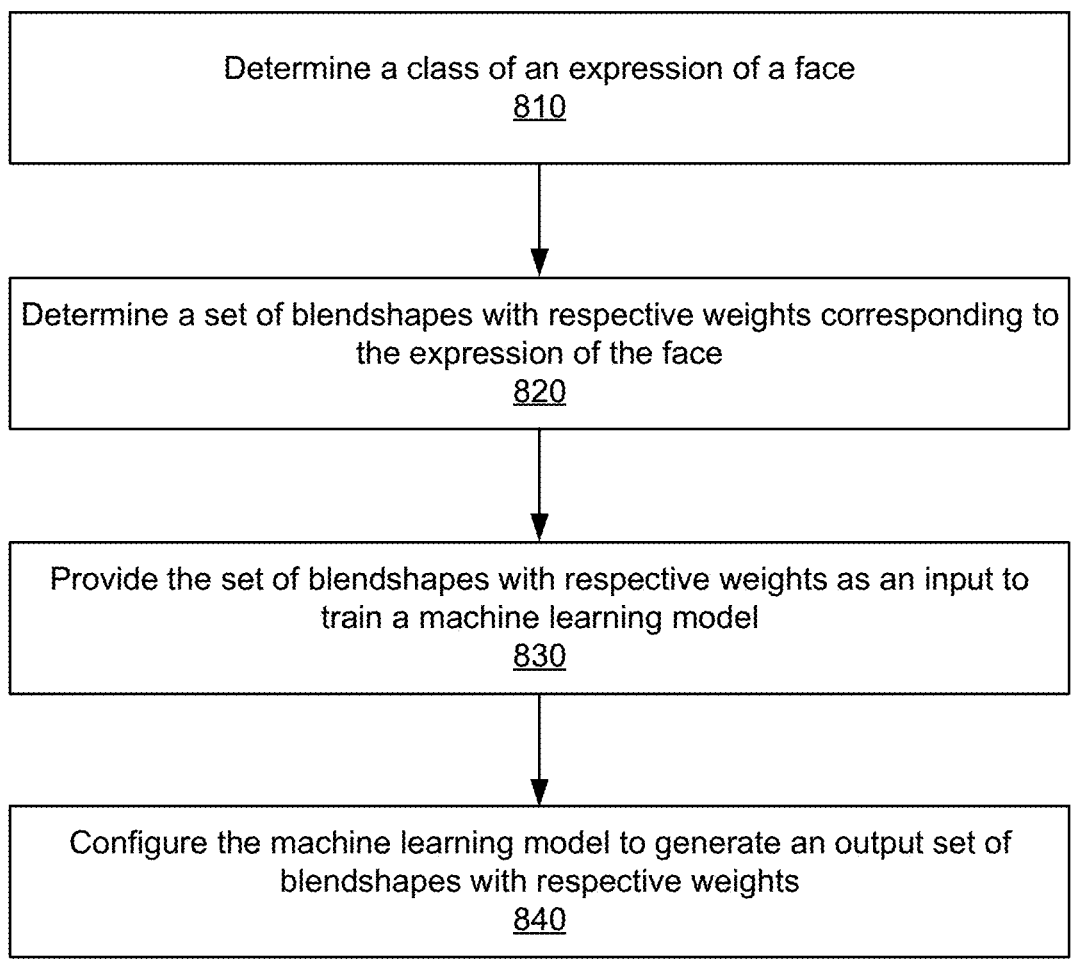
FIG. 8 is a flow chart illustrating a process of applying expressions to an avatar, according to an example implementation of the present disclosure.

FIG. 8 is a flow chart illustrating a process 800 of applying expression(s) to an avatar, according to an example implementation of the present disclosure. In some embodiments, the process 800 is performed by the system 110. In some embodiments, the process 800 is performed by other entities. In some embodiments, the process 800 includes more, fewer, or different steps than shown in FIG. 8.

In one approach, the system 110 determines 810 and/or selects a class of an expression of a face, from a plurality of defined classes for instance. Examples of classes (e.g., categories or types of facial expressions and/or visible emotions) include neutral, sad brow, angry, squint eye, lowered brow, wrinkled nose, etc. The system 110 may determine a class of expression, according to a set of attributes of an input image capturing a part of the face and/or a facial expression. In one aspect, an attribute indicates a state of a face part. For example, an attribute indicates whether an eye brow is raised, whether an eye is fully opened or squinting, etc. In one approach, each input image may be assigned to or is associated with a corresponding set of attributes through a manual review by a human reviewer. According to the set of attributes, the system 110 may map these attributes of the input image(s) to a corresponding class according to the mapping information. For example, the system 110 may determine that an attribute of a wrinkled nose in a first image of a person and an attribute of a raised eyebrow in a second image of the person can collectively map to a class of angry emotion.

In one approach, the system 110 determines 820 (e.g., identifies and/or selects) a set of blendshapes (e.g., from a plurality of defined blendshapes) with respective weights corresponding to the expression of the face. The system 110 can determine, for a first portion of the face in a first image, a first subset of the set of attributes, and can determine, for a second portion of the face in a second image, a second subset of the set of attributes. The system 110 may automatically determine, for one or more input images, weights of a corresponding set of blendshapes according to the set of attributes and/or the class. In one aspect, weight of a blendshape indicates how to model, shape (e.g., emphasize or blend a shape/structure), deform and/or modify a corresponding part of an avatar. For example, a first weight of a first blendshape indicates or causes to raise an upper lip by 5 mm, a second weight of a second blendshape indicates or causes to fully open a right eye, and a third weight of a third blendshape indicates or causes to close a left eye.

In some embodiments, the system 110 determines the set of blendshapes including corresponding weights, according to the class of the expression of the face. This determination of the corresponding weight can include one of: determining an amount of wrinkle applied to a nose, determining an amount of shift applied to an outer portion of an eyebrow, determining an amount of shift applied to an inner portion of the eyebrow, determining an amount of opening of an eye, determining an amount of opening of a mouth, determining an amount of shift applied to a cheek, or determining an amount of shift applied to an eye lid. The system 110 may store or obtain mapping information indicating mappings between classes and/or attributes, and corresponding sets or combinations of blendshapes (e.g., with corresponding weights). The system 110 may map attributes of one or more input images and a class of the one or more input images to weights of a corresponding set of blendshapes according to the mapping information to determine the set of blendshapes.

In one approach, the system 110 provides 830 the set of blendshapes with respective weights as an input to train a machine learning model (e.g., machine learning model 120). In one approach, the system 110 applies input images capturing face parts to the machine learning model as inputs, with corresponding sets of target blendshapes with corresponding weights as targets or ground truths, to adjust or modify parameters (e.g., coefficients, weights, biases, or any combination of these) of the machine learning model via training. The system 110 may apply a first image of at least a first portion of the face as a first input to train the machine learning model, and can apply a second image of at least a second portion of the face as a second input to train the machine learning model.

For example, the system 110 applies one or more input images to the machine learning model to generate, estimate or determine a set of estimated blendshapes. The system 110 may compare the set of estimated blendshapes with a set of target blendshapes, and adjust or modify parameters of the machine learning model according to the comparison, such that machine learning model can (be trained to) generate, estimate, select and/or determine a set of estimated blendshapes closer to the set of target blendshapes.

In one approach, the system 110 configures 840 or trains the machine learning model to generate an output set of blendshapes with respective weights. For example, in a runtime phase, the system 110 receives input images capturing face parts. The system 110 may apply the input images to the machine learning model, and obtain the set of blendshapes output from the machine learning model. The system 110 may render an image of an avatar according to the output set of blendshapes with the respective weights. In one aspect, the system 110 models, shapes, changes, modifies, and/or deforms a part of the avatar according to weight of a blendshape. For example, the system 110 generates an avatar with a raised upper lip, a fully opened right eye, and a squinting left eye, according to a weighted combination or blending of the set of blendshapes.

Figure 9:
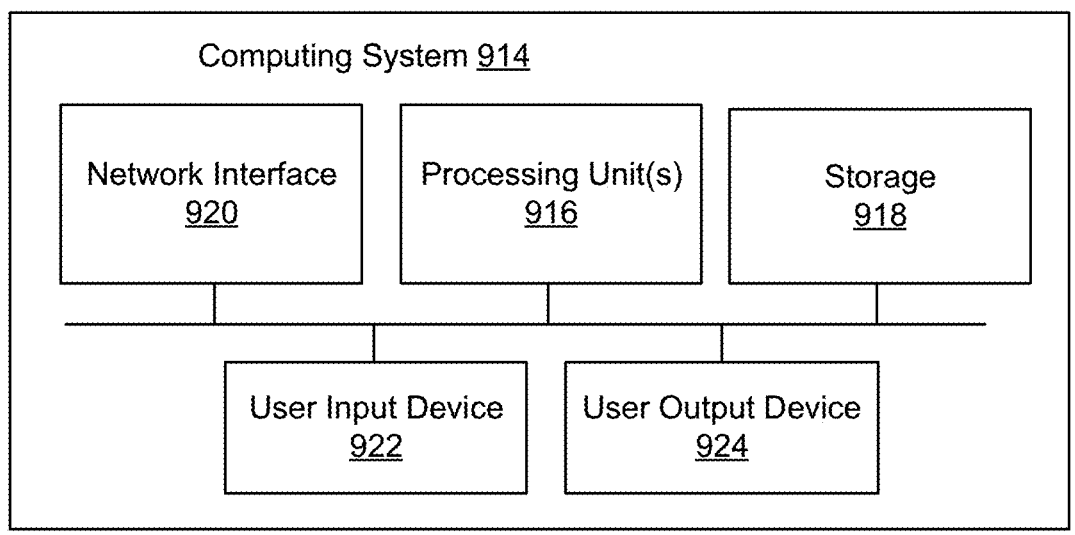
FIG. 9 is a block diagram of a computing environment according to an example implementation of the present disclosure.

Various operations described herein can be implemented on computer systems. FIG. 9 shows a block diagram of a representative computing system 914 usable to implement the present disclosure. In some embodiments, the system 100 of FIG. 1 is implemented by the computing system 914. Computing system 914 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 914 can be implemented to provide VR, AR, MR experience. In some embodiments, the computing system 914 can include conventional computer components such as processors 916, storage device 918, network interface 920, user input device 922, and user output device 924.

Network interface 920 can provide a connection to a wide area network (e.g., the Internet) to which WAN interface of a remote server system is also connected. Network interface 920 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 922 can include any device (or devices) via which a user can provide signals to computing system 914; computing system 914 can interpret the signals as indicative of particular user requests or information. User input device 922 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 924 can include any device via which computing system 914 can provide information to a user. For example, user output device 924 can include a display to display images generated by or delivered to computing system 914. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 924 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 916 can provide various functionality for computing system 914, including any of the functionality described herein as being performed by a server or client, or other functionality associated with message management services.

It will be appreciated that computing system 914 is illustrative and that variations and modifications are possible. Computer systems used in connection with the present disclosure can have other capabilities not specifically described here. Further, while computing system 914 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   determining, by one or more processors, a class of an expression of a face according to a set of attributes indicating states of portions of the face;
   determining, by the one or more processors according to the class of the expression of the face, a set of blendshapes with respective weights corresponding to the expression of the face;
   providing, by the one or more processors, the set of blendshapes with respective weights as an input to train a machine learning model;
   training, by the one or more processors, a neural network of the machine learning model according to the set of blendshapes with respective weights provided as the input; and
   configuring, by the one or more processors via training, the machine learning model to generate an output set of blendshapes with respective weights, according to an input image.

2. The method of claim 1, further comprising:
   rendering an image of an avatar according to the output set of blendshapes with the respective weights.

3. The method of claim 1, further comprising:
   generating, by a first sensor, a first image capturing a first portion of the face;
   generating, by a second sensor, a second image capturing a second portion of the face;
   determining, for the first portion of the face in the first image, a first subset of the set of attributes; and
   determining, for the second portion of the face in the second image, a second subset of the set of attributes.

4. The method of claim 1, further comprising providing an image of at least a portion of the face as another input to train the machine learning model.

5. The method of claim 1, wherein the set of attributes indicates at least one of whether an eye is closed, whether the eye is open, or whether the eye is squinting.

6. The method of claim 1, wherein the class of the expression is determined from a defined group of classes of expressions including neutral, sad brow, angry, squint eye, lowered brow, and wrinkled nose.

7. The method of claim 1, wherein determining the set of blendshapes, according to the class of the expression of the face, includes one of:
   determining an amount of wrinkle applied to a nose,
   determining an amount of shift applied to an outer portion of an eyebrow,
   determining an amount of shift applied to an inner portion of the eyebrow,
   determining an amount of opening of an eye,
   determining an amount of opening of a mouth,
   determining an amount of shift applied to a cheek, or
   determining an amount of shift applied to an eye lid.

8. The method of claim 1, further comprising:
   determining, by the one or more processors, an additional class of an expression of an additional face according to an additional set of attributes indicating states of portions of the additional face;
   determining, by the one or more processors according to the additional class of the expression of the additional face, an additional set of blendshapes with respective weights corresponding to the expression of the additional face; and
   providing, by the one or more processors, the additional set of blendshapes with respective weights as an additional input to train the machine learning model.

9. A system comprising:
   one or more processors configured to:
      determine a class of an expression of a face according to a set of attributes indicating states of portions of the face;
      determine, according to the class of the expression of the face, a set of blendshapes with respective weights corresponding to the expression of the face;
      provide the set of blendshapes with respective weights as an input to train a machine learning model;
      train a neural network of the machine learning model according to the set of blendshapes with respective weights provided as the input; and
      configure, via training, the machine learning model to generate an output set of blendshapes with respective weights, according to an input image.

10. The system of claim 9, wherein the one or more processors are further configured to:
    render an image of an avatar according to the output set of blendshapes with the respective weights.

11. The system of claim 9, further comprising:
    a first sensor configured to generate a first image capturing a first portion of the face; and
    a second sensor configured to generate a second image capturing a second portion of the face;
    wherein the one or more processors are configured to:
       determine, for the first portion of the face in the first image, a first subset of the set of attributes; and
       determine, for the second portion of the face in the second image, a second subset of the set of attributes.

12. The system of claim 9, wherein the one or more processors are further configured to provide an image of at least a portion of the face as another input to train the machine learning model.

13. The system of claim 9, wherein the set of attributes indicates at least one of whether an eye is closed, whether the eye is open, or whether the eye is squinting.

14. The system of claim 9, wherein the class of the expression is determined from a defined group of classes of expressions including neutral, sad brow, angry, squint eye, lowered brow, and wrinkled nose.

15. The system of claim 9, wherein the one or more processors are configured to determine the set of blendshapes, according to the class of the expression of the face, by at least one of:
    determining an amount of wrinkle applied to a nose,
    determining an amount of shift applied to an outer portion of an eyebrow,
    determining an amount of shift applied to an inner portion of the eyebrow,
    determining an amount of opening of an eye,
    determining an amount of opening of a mouth,
    determining an amount of shift applied to a cheek, or
    determining an amount of shift applied to an eye lid.

16. The system of claim 9, wherein the one or more processors are further configured to:
    determine an additional class of an expression of an additional face according to an additional set of attributes indicating states of portions of the additional face;
    determine, according to the additional class of the expression of the additional face, an additional set of blendshapes with respective weights corresponding to the expression of the additional face; and
    provide the additional set of blendshapes with respective weights as an additional input to train the machine learning model.

17. A non-transitory computer readable medium storing instructions when executed by one or more processors cause the one or more processors to:
- determine a class of an expression of a face according to a set of attributes indicating states of portions of the face;
- determine, according to the class of the expression of the face, a set of blendshapes with respective weights corresponding to the expression of the face;
- provide the set of blendshapes with respective weights as an input to train a machine learning model;
- train a neural network of the machine learning model according to the set of blendshapes with respective weights provided as the input; and
- configure, via training, the machine learning model to generate an output set of blendshapes with respective weights according to an input image.

18. The non-transitory computer readable medium of claim 17, further comprising instructions when executed by the one or more processors further cause the one or more processors to:
- render an image of an avatar according to the output set of blendshapes with the respective weights.

19. The non-transitory computer readable medium of claim 17, further comprising instructions when executed by the one or more processors further cause the one or more processors to:
- receive, from a first sensor, a first image capturing a first portion of the face;
- receive, from a second sensor, a second image capturing a second portion of the face;
- determine, for the first portion of the face in the first image, a first subset of the set of attributes; and
- determine, for the second portion of the face in the second image, a second subset of the set of attributes.

20. The non-transitory computer readable medium of claim 17, further comprising instructions when executed by the one or more processors further cause the one or more processors to:
- determine an additional class of an expression of an additional face according to an additional set of attributes indicating states of portions of the additional face;
- determine, according to the additional class of the expression of the additional face, an additional set of blendshapes with respective weights corresponding to the expression of the additional face; and
- provide the additional set of blendshapes with respective weights as an additional input to train the machine learning model.

* * * * *